(12) United States Patent
Hori et al.

(10) Patent No.: US 6,760,790 B2
(45) Date of Patent: Jul. 6, 2004

(54) DIRECT ACCESS CONTROLLER (75) Inventors: Yasuyuki Hori, Kawasaki (JP); Atsushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 10/342,291

(22) Filed: Jan. 15, 2003

(65) Prior Publication Data
US 2003/0177291 A1 Sep. 18, 2003

(30) Foreign Application Priority Data
Mar. 18, 2002 (JP) ........................................ 2002-074533

(51) Int. Cl.[7] .............................................. G06F 13/28
(52) U.S. Cl. ........................................ 710/22; 710/26
(58) Field of Search ..................................... 710/22–28

(56) References Cited
U.S. PATENT DOCUMENTS
6,684,267 B2 * 1/2004 Hiji ............................. 710/22

2003/0177291 A1 * 9/2003 Hori et al. ................... 710/22
2003/0200362 A1 * 10/2003 Hayashi et al. ............. 710/22

* cited by examiner

Primary Examiner—Fritz Fleming
(74) Attorney, Agent, or Firm—Arent Fox PLLC (57) ABSTRACT

A direct memory access controller for transferring data from a transfer source memory region to a transfer destination memory region, comprises: a transfer source address calculation unit which has transfer source address registers corresponding to a plurality of channels and which generates a transfer source address whenever data transfer is performed; a transfer destination address calculation unit which has transfer destination address registers corresponding to the plurality of channels and which generates a transfer destination address whenever data transfer is performed. The transfer source or destination address calculation unit calculates upon data transfer a transfer source or destination address for the following data transfer from the initially set transfer source or destination address and the transfer source or destination address register retains the initially set transfer source or destination address.

12 Claims, 7 Drawing Sheets

FIRST EMBODIMENT(1)

DIRECT ACCESS CONTROLLER

CROSS-REFERENCE TO RELATED APPLICATIONS

This application is based upon and claims the benefit of priority from the prior Japanese Patent Application No. 2002-74533, filed on Mar. 18, 2002, the entire contents of which are incorporated herein by reference.

BACKGROUND OF THE INVENTION

1. Field of the Invention

The present invention relates to a direct memory access controller (to be referred to hereafter as "DMAC") in an LSI such as a microprocessor, and more particularly to a DMAC which is capable of reducing the number of registers and thereby reducing power consumption.

2. Description of the Related Art

In recent LSIs such as microprocessors, increases in speed and functionality tend to be accompanied by increases in power consumption. Meanwhile, demands are being made for battery-operated portable information devices such as portable telephones or digital still cameras that are highly functional and have a low power consumption.

DMAC is provided into microprocessors in order to reduce the load on the CPU. A DMAC functions in place of a CPU to perform direct access to internal memory and external memory, and is used to transfer large amounts of data, to repeat data transfer within the same memory region, and so on. When, for example, a portable telephone or the like is switched back to active mode from power down mode, data in a predetermined memory region are transferred to another memory region, and whenever the buffer data in the bus interface becomes full, these data are transferred repeatedly into a predetermined memory region. A DMAC is used at such times to read data from a transfer source memory region and write the data into a transfer destination memory region.

A transfer source address, a transfer destination address, a transfer count, and an address increase/decrease value are set by the CPU, thereby the DMAC reads data in a predetermined memory region and writes these data into another predetermined memory region independently of the operations of the CPU. This setting information is written into registers which are built into the DMAC for each source/destination combination (channel). Thus, the CPU can cause the DMAC to perform appropriate data transfer from a specific transfer source to a specific destination source simply by selecting a set channel.

The aforementioned setting information is written into a set of registers corresponding to each channel inside the DMAC. Accordingly, in the DMAC, one set of registers for setting the information necessary to perform the aforementioned DMA is provided for each channel. Further, since these registers operate sychronously with a clock, wiring is provided to supply a clock to each register. In order to supply these clocks, the clock supply wiring must be driven, and thus by increasing the number of clock supply wirings, power consumption increases.

Accordingly, it is a trend that more registers and wirings to supply clocks to these registers are provided inside a DMAC, and the scale of the circuit increases, and in accompaniment therewith, power consumption also increase.

In particular, when the same DMA transfer is repeated, a reload register is provided and the initially set information is stored in the reload register such that when the DMAC completes all of the data transfers, the information inside the reload register is reset. This type of reload register is typically provided in each channel, and as a result, increases in the number of registers and increases in power consumption tend to occur.

SUMMARY OF THE INVENTION

It is therefore an object of the present invention to provide a DMAC which is capable of suppressing circuit scale and thereby also suppressing power consumption.

In order to achieve this object, a first aspect of the present invention is a direct memory access controller for transferring data from a transfer source memory region to a transfer destination memory region, comprising: a transfer source address calculation unit which has transfer source address registers corresponding to a plurality of channels and which generates a transfer source address whenever data transfer is performed; a transfer destination address calculation unit which has transfer destination address registers corresponding to the plurality of channels and which generates a transfer destination address whenever data transfer is performed; a transfer count calculation unit which has transfer count registers corresponding to the plurality of channels and which generates a remaining transfer count whenever data transfer is performed; and an address increase/decrease value setting unit which has address increase/decrease value registers corresponding to the plurality of channels, wherein the transfer source address calculation unit and/or said transfer destination address calculation unit calculate upon data transfer a transfer source address and/or transfer destination address for the following data transfer from the initially set transfer source address and/or transfer destination address, and wherein the transfer source address register and/or said transfer destination address register retain the initially set transfer source address and/or transfer destination address.

According to this first aspect of the invention, the transfer source address and/or transfer destination address are retained in the transfer source address register and/or transfer destination address register, and hence there is no need to provide a reload register. By eliminating a reload register provided in each channel, the circuit scale can be suppressed, whereby power consumption can also be suppressed.

A second aspect of the present invention in order to achieve the aforementioned object is a direct memory access controller for transferring data from a transfer source memory region to a transfer destination memory region, comprising: a transfer source address calculation unit which has transfer source address registers corresponding to a plurality of channels and which generates a transfer source address whenever data transfer is performed; a transfer destination address calculation unit which has transfer destination address registers corresponding to the plurality of channels and which generates a transfer destination address whenever data transfer is performed; a transfer count calculation unit which has transfer count registers corresponding to the plurality of channels and which generates a remaining transfer count whenever data transfer is performed; and an address increase/decrease value setting unit which has address increase/decrease value registers corresponding to the plurality of channels, wherein the transfer source address calculation unit and/or said transfer destination address calculation unit calculate upon data transfer the address at the time of the subsequent data transfer from the address at the time of the previous data transfer and store the address in the transfer source address register and/or transfer destination source register, and upon completion of a series of data transfers calculate the initially set address from the address at the time of completion and store the address in said transfer source address register and/or said transfer destination address register.

According to this second aspect of the invention, a new address is calculated whenever data transfer is performed, and when a series of data transfers is complete, the initially set address is calculated from the address at the time of completion and stored in a register. Hence there is no need to provide a register for reload, and as a result the circuit scale is suppressed, whereby power consumption can be reduced.

DESCRIPTION OF THE PREFERRED EMBODIMENTS

Embodiments of the present invention will be described below with reference to the drawings. However, the scope of protection of the present invention is not limited to or by the following embodiments, and covers the inventions appearing in the claims for the patent and equivalent items thereof.

Figure 1:
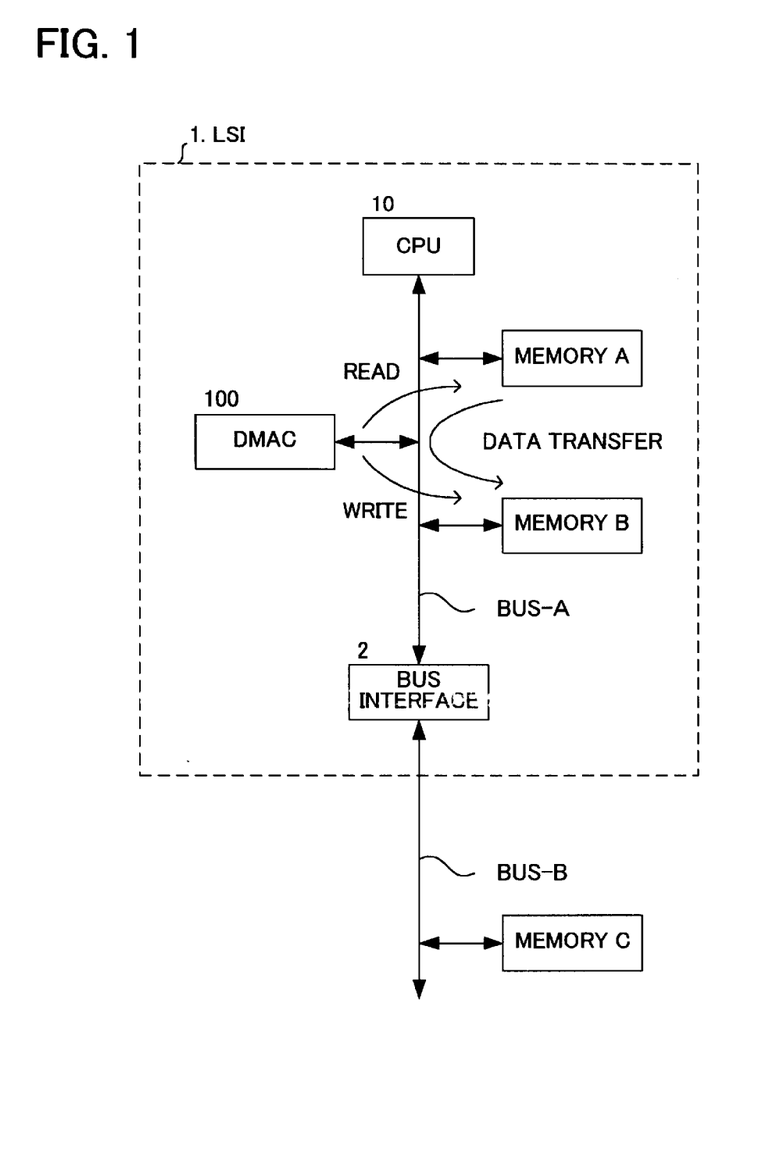
FIG. 1 is a system diagram for explaining a DMAC.

FIG. 1 is a system diagram for explaining a DMAC. In an LSI 1 such as a microprocessor, a CPU 10 is connected to memory A and memory B via an internal bus A. A bus interface circuit 2 is provided at the interface with an external bus B, and memory C is connected to the external bus B. A DMAC 100 is provided within the LSI 1 for performing memory access in place of a CPU.

When data are to be transferred from memory A to memory B, for example, this DMAC accesses to memory A in accordance with a transfer source address to read the data onto the bus A, and then accesses to memory B in accordance with a transfer destination address to write the data which were read onto the bus A into memory B. In other types of data transfer, for example transferring data inside a buffer in the bus interface 2 to memory A or memory B, or transferring data from external memory C to memory A or B, the DMAC also accesses to the transfer source address for read and accesses to the transfer destination address for write. In order to transfer data of a predetermined volume, the aforementioned read access and write access must be repeated a plurality of times. Since the transfer source and transfer destination are combined in such a manner, a plurality of data transfer channels is necessary.

In data transfer of this type, the transfer count and the address increase/decrease value are also required as set information in addition to the transfer source address and transfer destination address. The CPU 10 causes the DMAC to perform data transfer by setting this set information in registers inside the DMAC. Accordingly, a set of registers is provided corresponding to the plurality of transfer channels inside the DMAC for setting this set information.

Figure 2:
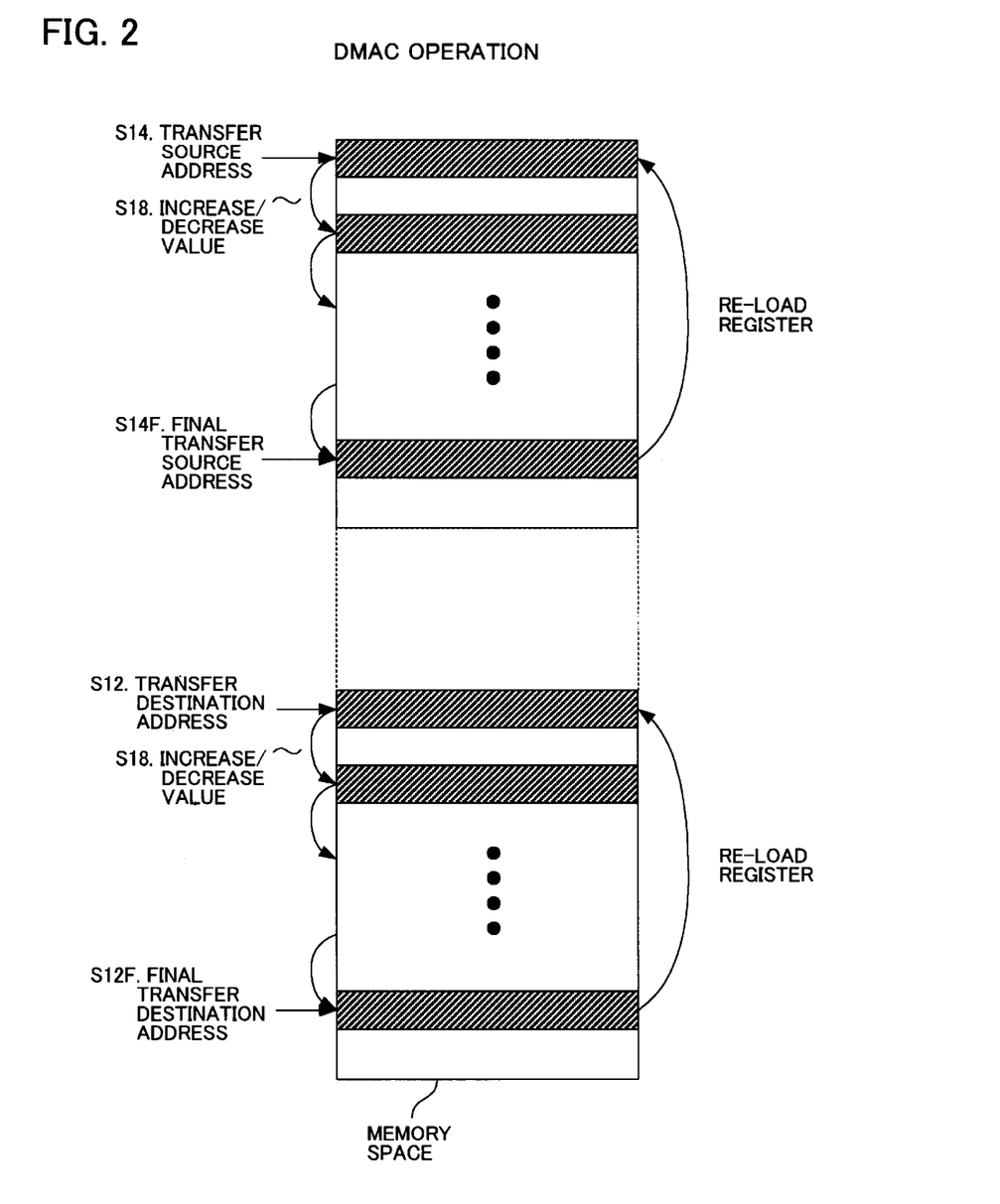
FIG. 2 is a view explaining the operation of a DMAC.

FIG. 2 is a view for explaining the operations of a DMAC. FIG. 2 illustrates the memory space of the CPU. In the memory space in FIG. 1, addresses are allocated to memory A, memory B, the butter memory inside the bus interface, and the external memory C. Data in regions below transfer source address S14 inside the memory space are assumed to be transferred to regions below transfer destination address S12.

The transfer source address S14 and its address increase/decrease value S18, the transfer destination address S12 and its address increase/decrease value S18, and the transfer count are set in the registers inside the DMAC by the CPU. Then, in accordance with the setting values thereof, the data inside the transfer source address S14 are read and written to the transfer destination address S12. When one data transfer is complete, the address increase/decrease value S18 is added to or deducted from the transfer source address S14, whereby the next transfer source address is calculated. The address increase/decrease value S18 is likewise added to or deducted from the transfer destination address S12, whereby the next transfer destination address is calculated. Thus, during the following data transfer, the data of the new transfer source address are transferred to the transfer destination address region.

When this series of data transfers is repeated a set number of times, data transfer is completed. At the point of completion, the transfer source address becomes the final transfer source address S14F and the transfer destination address becomes the final transfer destination address S12F. Here, it a register reload function has been set, the initial transfer source address S14, transfer destination address S12, and transfer count are reset in each register and the same data transfer is performed in response to a subsequent data transfer request.

If the increase/decrease value is plus, the address is modified in an increasing direction, and if the increase/decrease value is minus, the address is modified in a decreasing direction. If the increase/decrease value is zero, access to the same address is repeated, and if the increase/decrease value is 1, access is repeated to successive addresses. If the increase/decrease value is larger than 1, access is repeated, skipping one or more addresses, as is shown in FIG. 2.

Figure 3:
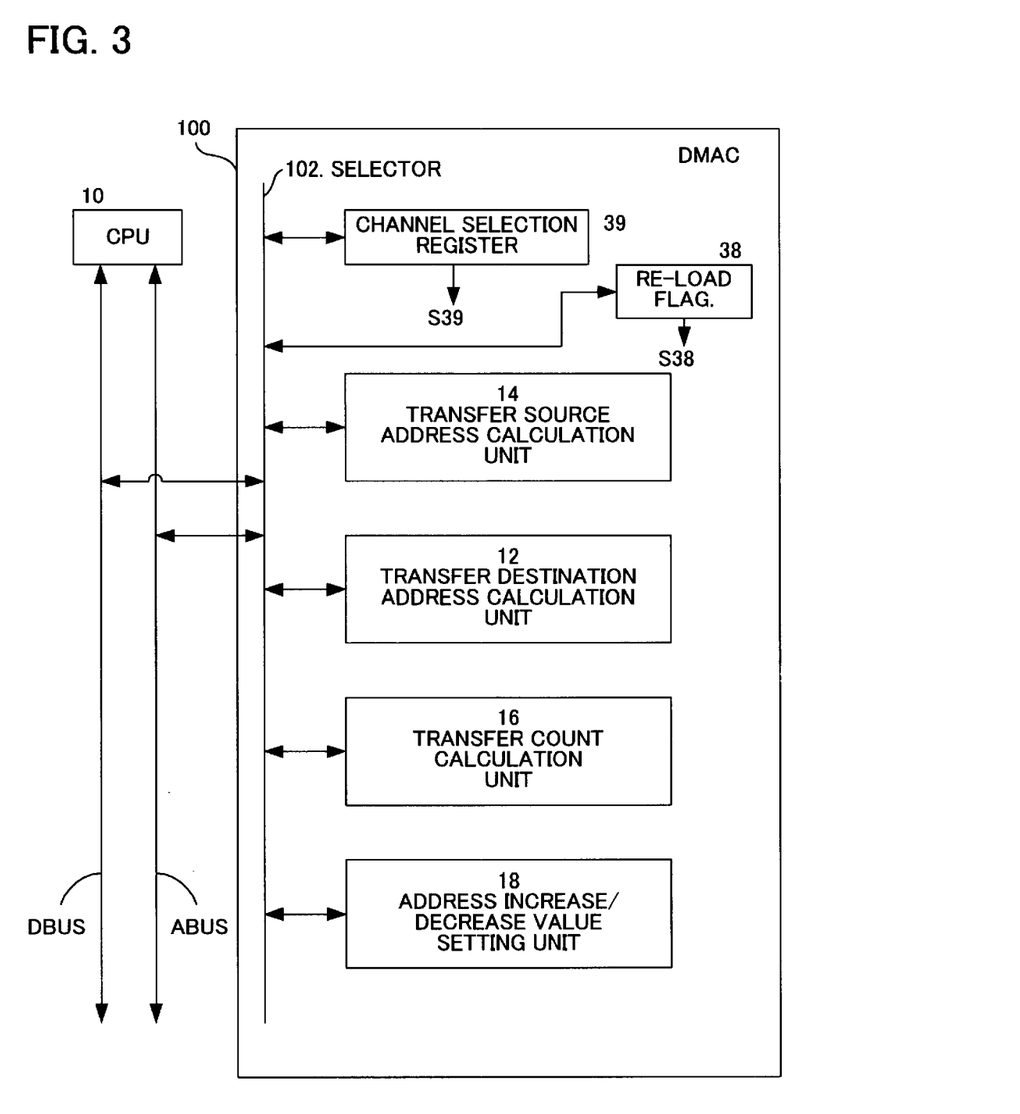
FIG. 3 is a schematic constitutional diagram of a DMAC.

FIG. 3 is a schematic constitutional diagram of a DMAC. A data bus DBUS and an address bus ABUS are illustrated in FIG. 3. A transfer source address calculation unit 14, a transfer destination address calculation unit 12, a transfer count calculation unit 16, and an address increase/decrease value setting unit 18 are provided inside the DMAC 100. These units perform input and output of data and addresses with the data bus DBUS and the address bus ABUS via a selector 102.

A transfer source address register and a calculation circuit corresponding to the plurality of channels are provided in the transfer source address calculation unit 14. A transfer destination address register and a calculation circuit corresponding to the plurality of channels are likewise provided in the transfer destination address calculation unit 12. The transfer count calculation unit 16 comprises a transfer count register and a calculation circuit for counting the transfer count upon each data transfer corresponding to the plurality of channels. The address increase/decrease value setting unit 18 comprises an address increase/decrease value register corresponding to the plurality of channels.

The DMAC 100 further comprises a channel select register 39 and a reload flag register 38. When the CPU sets a channel to be subject to data transfer at the channel select register 39, the registers which correspond to the set channel are selected from the respective units 12, 14, 16, 18. Further, if a reload flag is set in the reload flag register 38 from the CPU, each piece of initially set setting information is reloaded to its respective register following completion of data transfer. In order for this, a selected channel signal S39 and a reload flag signal S38 are appropriately supplied to the units 12, 14, 16, 18 from the two registers 39, 38.

The address increase/decrease value unit 18 is provided with a transfer source address unit and a transfer destination address unit. Note, however, that these are not illustrated separately in FIG. 3.

A typical DMAC circuit will now be explained in detail, after which the DMAC circuit of this embodiment will be explained in detail.

Figure 4:
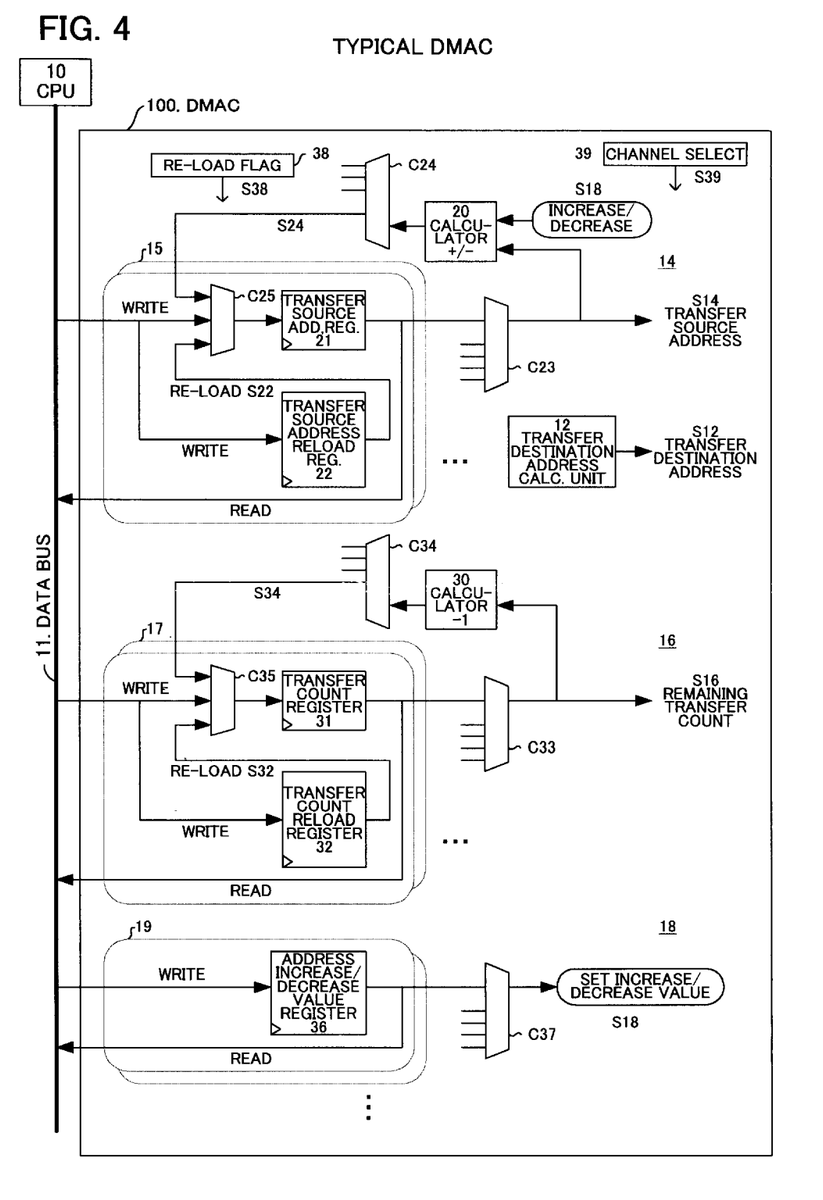
FIG. 4 is a detailed circuit diagram of a typical DMAC.

FIG. 4 is a detailed circuit diagram of a typical DMAC. In the detailed circuit diagram of FIG. 4, the transfer source address calculation unit 14, transfer count calculation unit 16, and address increase/decrease value setting unit 18 are illustrated, and the transfer destination calculation unit 12 is illustrated in a black box. The transfer destination calculation unit 12 is of a similar circuit constitution to the transfer source address calculation unit 14, and therefore a detailed circuit diagram thereof has been omitted. The address increase/decrease value setting unit 18 is illustrated without being divided into a transfer source address unit and a transfer destination address unit in FIG. 4 also. The selector 102 inside the DMAC 100 is illustrated divided into a plurality of selectors.

The transfer source address calculation unit 14 comprises a register unit 15 provided in each channel, a calculation device 20 for adding or deducting the increase/decrease value set value S18 to or from the transfer source address which is stored in the transfer source address register 21 upon each data transfer, and selectors C23, C24 to the front and rear thereof. The calculation device 20 and selectors C23, C24 are provided in common among the plurality of register units 15.

A selector C25, a transfer source address register 21, and a transfer source address reload register 22 are provided inside the register unit 15. An initial transfer source address is written into the transfer source address register 21 and transfer source address reload register 22 from the CPU 10 via the selector C25. The selector C23 also selects a channel set in the channel select register 39, and outputs the address from the transfer source address register 21 as the transfer source address S14.

Whenever data are transferred, the calculation device 20 adds or deducts the set increase/decrease value S18 to or from the transfer source address S14, whereby a transfer source address for the following data transfer is generated. This transfer source address is written into the transfer source address register 21 via the selector C24 which selects a set channel. Thus, an updated transfer source address for data transfer is always stored in the transfer source address register 21, and the initially-set transfer source address is always stored in the transfer source address reload register 22.

The transfer destination address calculation unit 12 is constituted identically to the aforementioned calculation unit 14, except that the transfer source address register 21 is replaced by a transfer destination address register, and the transfer source reload address register 22 is replaced by a transfer destination reload address register.

The transfer count calculation unit 16 is provided with a register unit 17 in each channel comprising a transfer count register 31 and a transfer count reload register 32. A selector C33, a selector C34, and a calculation device 30 which makes deductions of 1 at a time are provided in common among the plurality of register units 17. A transfer count value is written into the two registers 31, 32 as an initial value by the CPU 10, and whenever data are transferred, the calculation device 30 deducts the value of the transfer count register 31 by 1. This value is stored in the transfer count register 31. Thus, the remaining transfer count is maintained in the transfer count register 31, and the initial value transfer count is maintained in the transfer count reload register 32. Then, whenever data transfer is performed, the remaining transfer count S16 is outputted via the selector C33 which selects a channel set in the channel setting register 39.

DMA is completed when this remaining transfer count S16 reaches 0, and in response thereto, the reload flag S38 which is set in the reload flag register 38 is read out. If a reload function has been set, the initial value of the transfer address reload register 22 is written into the transfer source address register 21. The initial value of the transfer count reload register 32 is likewise written into the transfer count register 31. As a result, identical data transfer may be repeated.

The address increase/decrease setting unit 18 comprises a register unit 19 in each channel having an address increase/decrease register 36. An address increase or decrease value is written therein by the CPU, and this value is outputted as the increase/decrease set value S18 via a selector C37.

The selectors C23, C24, C33, C34, C37 select a channel set in the channel select register 39. Note that a channel select selector is omitted between the inputs of the register units 15, 17, 19 and the data bus 11.

In this typical DMAC, a transfer source address reload register 22 is provided in the register unit 15 inside the transfer source and transfer destination calculation units 14, 12 in each channel, and the transfer count reload register 32 is provided in the register unit 17 inside the transfer count calculation unit 16. If the number of channels increases, the number of reload registers also increases, as does the amount of clock supply wiring for the clocks which are supplied to the registers. Thus, the circuit scale and power consumption also increase.

Figure 5:
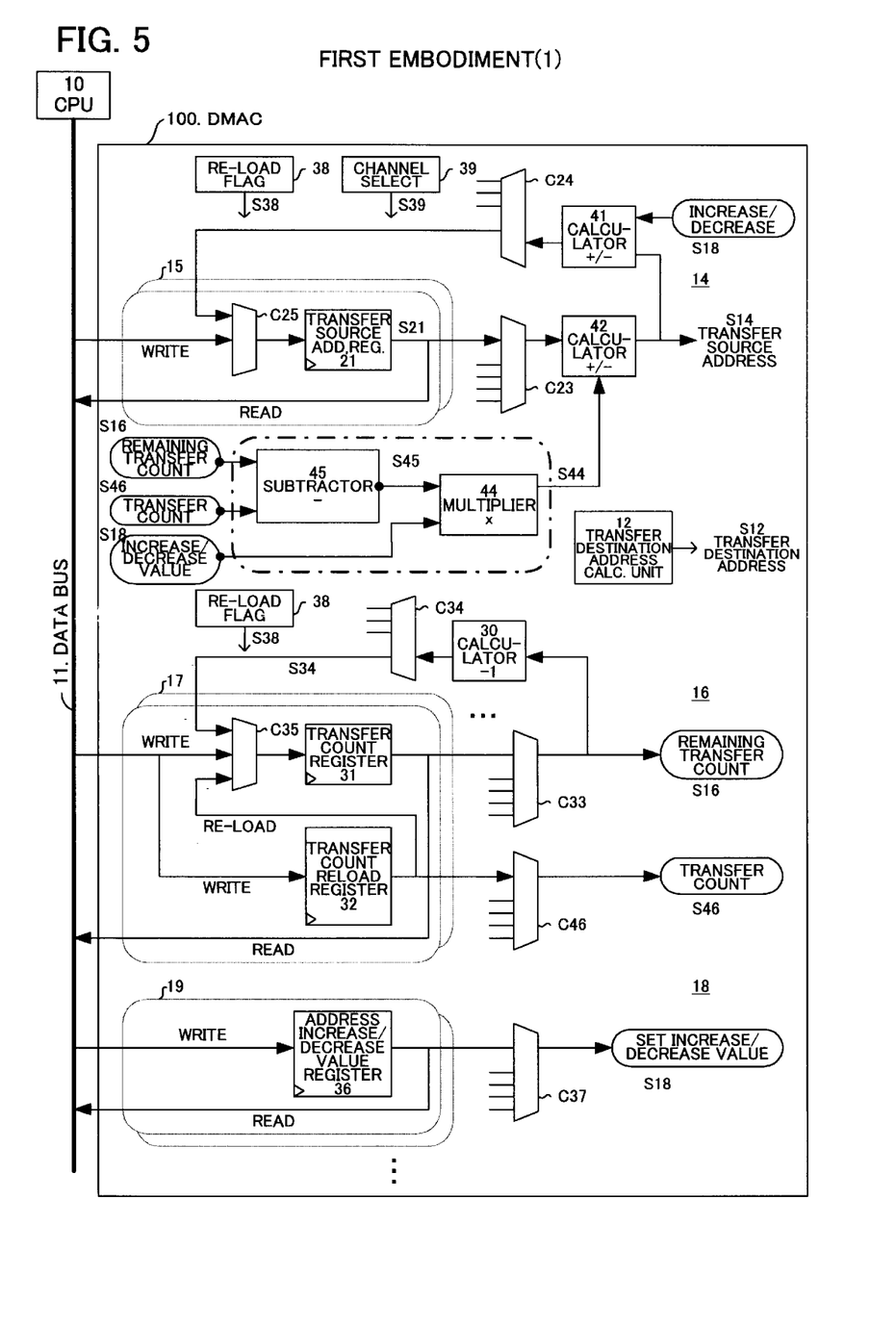
FIG. 5 is a detailed circuit diagram of a first DMAC of the present embodiment.

FIG. 5 is a detailed circuit diagram of a first DMAC of this embodiment. In FIG. 5, as in FIG. 4, the transfer source address calculation unit 14, transfer count calculation unit 16, and address increase/decrease setting unit 18 are illustrated, and the transfer destination calculation unit 12 is illustrated in a black box. In other words, the transfer destination calculation unit 12 has a similar circuit constitution to the transfer source address calculation unit 14, and therefore a detailed circuit diagram thereof has been omitted. The address increase/decrease setting unit 18 is illustrated without being divided into a transfer source address unit and a transfer destination address unit in FIG. 5 also.

The address increase/decrease setting unit 18 has the same constitution as that in FIG. 4. Accordingly, the address increase/decrease set value S18 of the selected channel is outputted.

The transfer count calculation unit 16 is provided, in addition to that of the constitution in FIG. 4, with a selector C46, and outputs an initially set transfer count S46 from within the transfer count reload register 32 of the selected channel.

In this embodiment, no transfer source address reload register is provided inside the register unit 15 in the transfer source address calculation unit 14. Only the transfer source address register 21 and a selector C25 are provided inside the register unit 15. In accordance therewith, calculation devices 41, 42, 44, 45 are provided in common among the plurality of register units 15. Thus, when the reload function is used, the initial value inside the transfer source address register 21 does not alter, and the transfer source address S14 at the time of data transfer is calculated by the calculation device 42 and outputted. When the reload function is not used, the increase/decrease set value S18 is added to or deducted from the transfer source address S14 by the calculation device 41 whenever data transfer is performed, and is overwritten to the transfer source address register 21.

In other words, when the reload function is used, the calculation device 42 is activated and the calculation device 41 is deactivated in response to the flag S38 of the reload flag register 38. Then, when data transfer is performed, the subtractor 45 determines the executed transfer count S45 by deducting the remaining transfer count S16 from the transfer count S46, the multiplier 44 determines the total increase/decrease S44 by multiplying the executed transfer count S45 and the increase/decrease set value S18, and the calculation device 42 generates a new transfer source address S14 by adding or deducting this total increase/decrease S44 to or from the initially set transfer source address S21.

When all of the data transfers are complete, the remaining transfer count S16 becomes zero, and in response thereto, the value of the transfer count reload register 32 is written into the transfer count register 31 via the selector C35. Simultaneously, the remaining transfer count S16 returns to the initial value, and the executed transfer count S45, which is the output of the subtracter 45, becomes zero. Since the initial value transfer source address is retained in the transfer source address register 21, the transfer source address calculation unit 14 is able to repeat generation of a transfer source address in a similar fashion in response to a new transfer request.

Further, when the reload function is not used, the computing device 41 is activated and the computing device 42 is deactivated in response to the flag S38 of the reload flag register 38, and thus, when data transfer is performed, the computing device 41 determines a new transfer source address in a similar fashion to FIG. 4, and writes this transfer source address into the transfer source address register 21. Thus, an updated transfer source address is stored in the transfer source address register 21.

The calculation device 42, subtracter 45, and multiplier 44 are added in the aforementioned embodiment, but are only provided in common among the plurality of register units 15. On the other hand, a reload register is omitted from the register unit 15, and as a result the circuit scale is reduced, leading to a reduction in the power consumption.

As described above, a reload register is omitted from the transfer source address unit 15 in the first DMAC, and thus when the reload function is active upon data transfer, the value resulting from the multiplication of the executed transfer count S45 with the address increase/decrease set value S18 is added to or deducted from the initially set transfer destination address S21, whereby a new transfer source address S14 is generated. Accordingly, the initially set transfer source address is retained in the transfer source address register 21, and thus there is no need to write a reload register value for reload into the transfer source address register 21 when a series of data transfers is complete. This constitution also serves for the transfer destination address calculation unit 12 such that a reload register is unnecessary in the register unit thereof (not shown).

Figure 6:
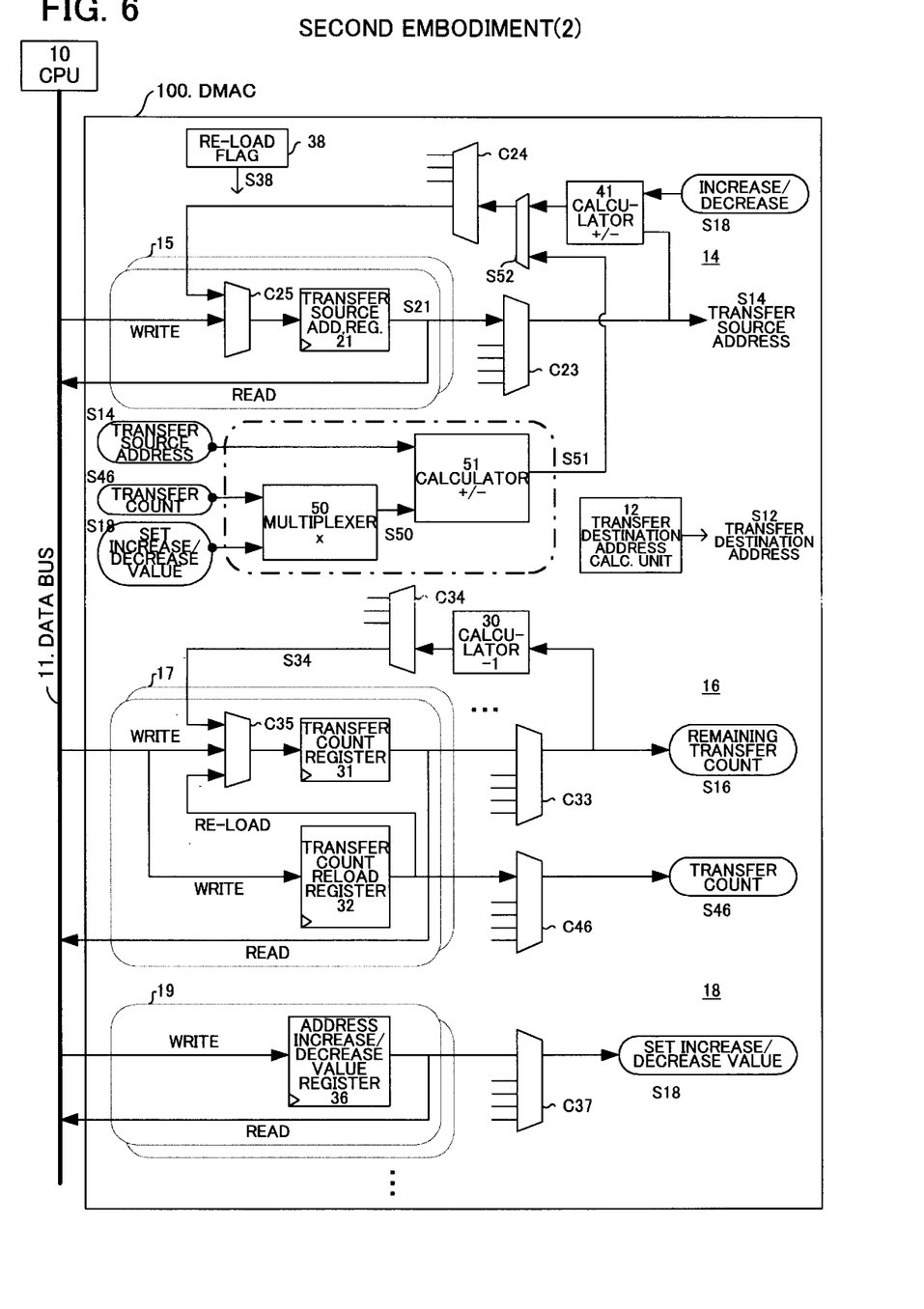
FIG. 6 is a detailed circuit diagram of a second DMAC of the present embodiment.

FIG. 6 is a detailed circuit diagram of a second DMAC of this embodiment. In this embodiment, the transfer count calculation unit 16 and the address increase/decrease setting unit 18 are constituted similarly to the embodiment in FIG. 5, whereas the transfer source calculation unit 14 and transfer destination address unit 12 differ therefrom. In FIG. 6, only the transfer source address calculation unit 14 is illustrated in detail.

A transfer address reload register is not provided in the register unit 15 inside the transfer source address calculation unit 14. A calculation device 41, a multiplier 50, and a calculation device 51 are provided in common among the plurality of register units 15. First, a transfer source address is stored as an initial value in the transfer source address register 21 such that when data transfer is performed, a subsequent transfer source address for data transfer is calculated (added or deducted) by the calculation device 41 and stored in the transfer source address register 21. The operation to update this transfer source address is the same as that performed in the transfer source address calculation unit in FIG. 4. The update operation remains the same whether a reload function is provided or not.

Then, in the transfer source address calculation unit 14, when all of the data transfers are complete and if the reload function is in an activated state, the multiplier 50 determines the total increase or decrease value S50 by multiplying the address increase/decrease set value S18 with the transfer count S46, and the calculation device 51 determines the initial value transfer source address S51 by adding or deducting the total address increase or decrease value S50 to or from the final transfer source address S14, whereupon the initial value transfer source address S51 is reloaded into the transfer source address register 21 via the selectors C52, C24, and C25. The deduction and addition of the calculation device 51 respectively correspond to the addition and deduction of the calculation device 41. In other words, each time the calculation device 41 adds the increase/decrease set value, the calculation device 51 deducts same, and when the calculation device 41 deducts the increase/decrease set value, the calculation device 51 adds same.

The transfer destination address calculation unit 12 has a similar constitution, wherein the transfer destination address is updated whenever data transfer is performed and the final transfer destination address is determined when all of the data transfers are completed by adding or deducting the product of the transfer count and the address increase or decrease value to or from the final transfer destination address. This final transfer destination address is then written into the transfer destination address register.

In this embodiment also, there is no need to provide a reload register in the register unit 15 inside the transfer source address calculation unit 14, and as a result, the circuit scale can be reduced and power consumption can be suppressed accordingly. The multiplier 50 and calculation device 51 which are provided instead are only provided in common among the plurality of register units 15, and therefore no great increase in circuit scale occurs.

Figure 7:
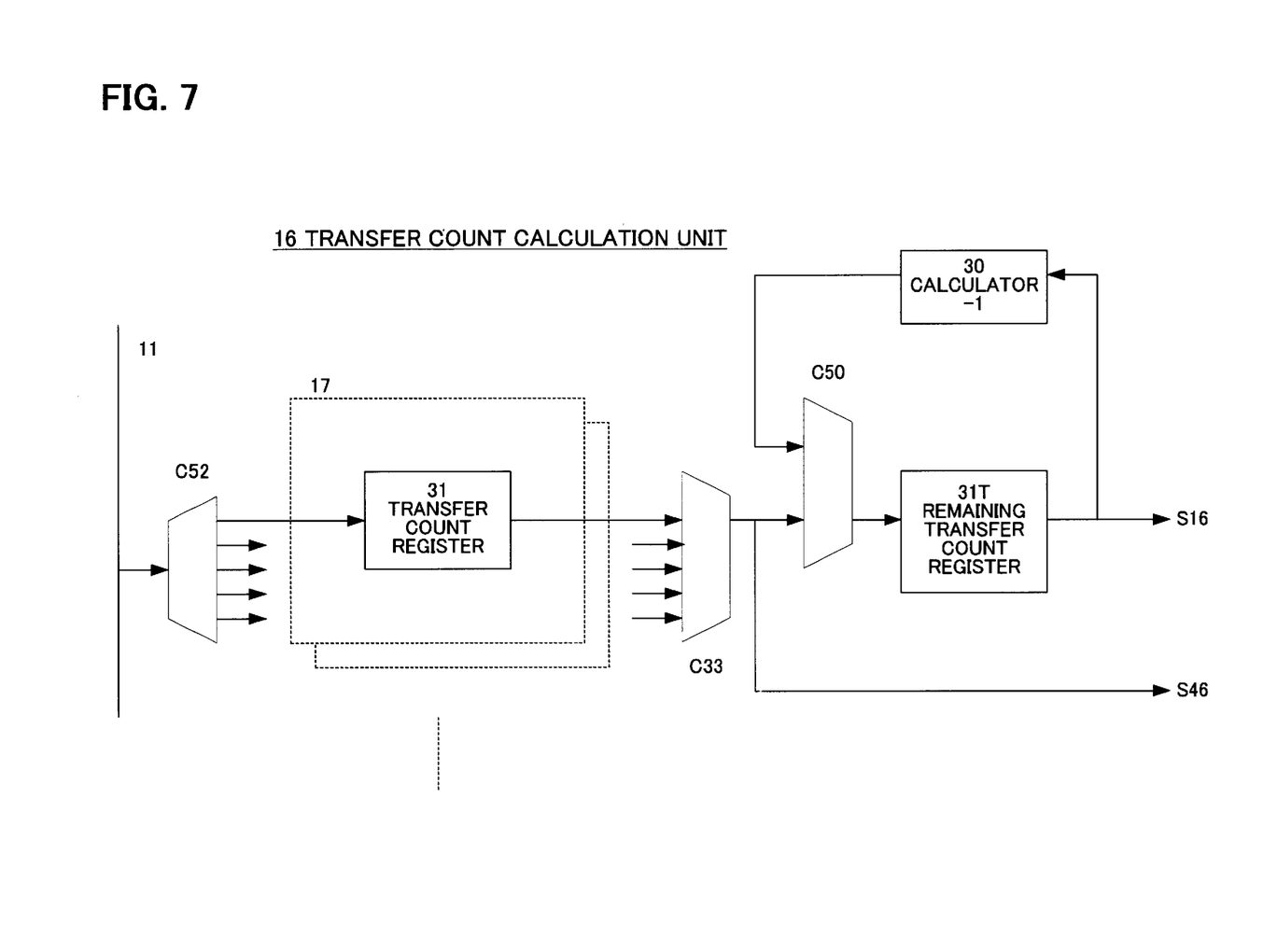
FIG. 7 is a view showing an improved example of a transfer count calculation unit of the present embodiment.

FIG. 7 is a view showing an improved example of a transfer count calculation unit in this embodiment. This example also has a constitution in which the transfer count reload register 32 has been omitted from the register unit 17 inside the transfer count calculation unit 16, thereby reducing the circuit scale and suppressing power consumption.

In the transfer count calculation unit 16 in FIG. 7, only the transfer count register 31 is provided in the register unit 17 provided in each channel, and the initial value data transfer count is set from the CPU 10 via a selector C52. When data transfer begins, the transfer count of the transfer count register 31 corresponding to the selected channel is written to the remaining transfer count register 31T via a selector C33. Upon subsequent data transfers, a calculation device 30 deducts 1 from the transfer count, whereupon the updated remaining transfer count is written to the remaining transfer count register 30T via a selector C50. Also, the output of the selector C33 becomes the initial value transfer count S46. In other words, the remaining transfer count S16 is written into the transfer count register 31T which is provided in common among the plurality of register units 17 whenever data transfer is performed.

The transfer count register 31 inside the register unit 17 retains the initially set transfer count regardless of whether a reload function is activated or deactivated. There is therefore no need to reload the initially set value into the transfer count register 31 even when the reload function is in an activated state.

Since no reload register is provided in the register unit 17 in the transfer count calculation unit 16 in FIG. 7, circuit scale may be reduced, leading to a decrease in power consumption.

The multiplier 44 of the first DMAC in FIG. 5 and the multiplier 50 of the second DMAC in FIG. 6 generally have a large circuit scale. When the increase/decrease set value S18 of an address is limited to 1, 2, 4 and power of 2, however, these multipliers may be constituted by a shifter, whereby the circuit scale of the multipliers may be suppressed.

According to the present invention as described above, a DMAC having a reload function in which the number of registers has been suppressed can be provided. By suppressing the number of registers, the amount of clock wiring that is supplied to the registers can also be reduced. As a result, a DMAC in which the amount of power consumption may be suppressed can be provided.

What is claimed is:

1. A direct memory access controller for transferring data from a transfer source memory region to a transfer destination memory region, comprising:

a transfer source address calculation unit which has transfer source address registers corresponding to a plurality of channels and which generates a transfer source address whenever data transfer is performed;

a transfer destination address calculation unit which has transfer destination address registers corresponding to said plurality of channels and which generates a transfer destination address whenever data transfer is performed;

a transfer count calculation unit which has transfer count registers corresponding to said plurality of channels and which generates a remaining transfer count whenever data transfer is performed; and an address increase/decrease value setting unit which has address increase/decrease value registers corresponding to said plurality of channels, wherein said transfer source address calculation unit and/or said transfer destination address calculation unit comprise a calculation section which calculates upon data transfer a data transfer source address and/or transfer destination address for a subsequent data transfer from an initially set transfer source address and/or transfer destination address, and wherein said transfer source address register and/or said transfer destination address register retain said initially set transfer source address and/or transfer destination address.

2. The direct memory access controller according to claim 1, wherein said calculation section is provided in common among said transfer source address registers and/or transfer destination address registers which are provided in correspondence with said plurality of channels.

3. The direct memory access controller according to claim 1, wherein said calculation section multiplies the address increase/decrease value in said address increase/decrease value register by a difference between an initially set transfer count and said remaining transfer count, and adds or deducts the initially set transfer source address and/or transfer destination address to or from the result of said multiplication.

4. The direct memory access controller according to claim 3, wherein said calculation section is activated when a reload function is in an activated state.

5. The direct memory access controller according to claim 1, wherein a new transfer source address and/or transfer destination address, resulting from the addition or deduction of the address increase/decrease value to or from the transfer source address and/or transfer destination address at the time of data transfer, is stored in said transfer source address register and/or transfer destination address register when the reload function is in a deactivated state.

6. A direct memory access controller for transferring data from a transfer source memory region to a transfer destination memory region, comprising:

a transfer source address calculation unit which has transfer source address registers corresponding to a plurality of channels and which generates a transfer source address whenever data transfer is performed;

a transfer destination address calculation unit which has transfer destination address registers corresponding to said plurality of channels and which generates a transfer destination address whenever data transfer is performed;

a transfer count calculation unit which has transfer count registers corresponding to said plurality of channels and which generates a remaining transfer count whenever data transfer is performed; and an address increase/decrease value setting unit which has address increase/decrease value registers corresponding to said plurality of channels, wherein said transfer source address calculation unit and/or said transfer destination address calculation unit comprise a first calculation section which calculates from an address at the time of a data transfer an address at the time of a subsequent data transfer and stores the calculated address in the transfer source address register and/or transfer destination source register whenever data transfer is performed, and a second calculation section which, upon completion of a series of data transfers, calculates an initially set address from an address at the time of completion and stores the calculated address in said transfer source address register and/or said transfer destination address register.

7. The direct memory access controller according to claim 6, wherein said first and second calculation sections are provided in common among said transfer source address registers and/or transfer destination address registers which are provided in correspondence to said plurality of channels.

8. The direct memory access controller according to claim 6, wherein said second calculation section multiplies the transfer count and the address increase/decrease value, and adds or deducts the product thereof to or from the address at the time of completion of the data transfers in order to calculate said initially set address.

9. The direct memory access controller according to claim 6, wherein said first calculation section adds or deducts the address increase/decrease value to or from the transfer source address and/or transfer destination address in order to calculate the address at the time of the subsequent data transfer.

10. The direct memory access controller according to claim 6, wherein said second calculation section stores the initially set address in said transfer source address register and/or transfer destination address register, when a reload function is in an activated state.

11. A direct memory access controller which transfers data from a transfer source memory region to a transfer destination memory region, comprising:

a transfer source address calculation unit which has transfer source address registers corresponding to a plurality of channels and which generates a transfer source address whenever data transfer is performed;

a transfer destination address calculation unit which has transfer destination address registers corresponding to said plurality of channels and which generates a transfer destination address whenever data transfer is performed;

a transfer count calculation unit which has transfer count registers corresponding to said plurality of channels and which generates a remaining transfer count whenever data transfer is performed; and an address increase/decrease value setting unit which has address increase/decrease value registers corresponding to said plurality of channels, wherein said transfer count calculation unit stores said transfer count which is initially set at the beginning of data transfer, and comprises a remaining transfer count register in common among said plurality of transfer count registers for storing the remaining transfer count which is reduced whenever data transfer is performed, the initially set transfer count being retained in said transfer count register.

12. The direct memory access controller according to claim 11, wherein the transfer count calculation unit further comprises a subtracter in common among said plurality of transfer count registers for deducting the remaining transfer count in said remaining transfer count register by 1 whenever said data transfer is performed.

* * * * *